(12) United States Patent
Chen et al.

(10) Patent No.: US 11,886,967 B1
(45) Date of Patent: Jan. 30, 2024

(54) LONG-TERM STREAMFLOW FORECAST METHOD AND SYSTEM BASED ON PROCESS-DATA SYNERGIC DRIVE

(71) Applicant: WUHAN UNIVERSITY, Hubei (CN)

(72) Inventors: Jie Chen, Hubei (CN); Wenxin Xu, Hubei (CN); Jiabo Yin, Hubei (CN); Lihua Xiong, Hubei (CN); Hua Chen, Hubei (CN)

(73) Assignee: WUHAN UNIVERSITY, Hubei (CN)

( * ) Notice: Subject to any disclaimer, the term of this patent is extended or adjusted under 35 U.S.C. 154(b) by 0 days.

(21) Appl. No.: 18/353,121

(22) Filed: Jul. 17, 2023

(30) Foreign Application Priority Data

Aug. 30, 2022 (CN) .......................... 202211047557.1

(51) Int. Cl.
*G06N 20/00* (2019.01)

(52) U.S. Cl.
CPC .................................... *G06N 20/00* (2019.01)

(58) Field of Classification Search
None
See application file for complete search history.

(56) References Cited

U.S. PATENT DOCUMENTS

| 2016/0247075 A1 | 8/2016 | Mewes et al. |
| 2022/0061236 A1 | 3/2022 | Guan et al. |

FOREIGN PATENT DOCUMENTS

| CN | 108304668 | 7/2018 |
| CN | 109711617 | 5/2019 |
| CN | 110288157 | 9/2019 |
| CN | 110909943 | 3/2020 |
| CN | 112801342 | 5/2021 |
| CN | 113705877 | 11/2021 |

OTHER PUBLICATIONS

Sekulić, et al., A High-Resolution Daily Gridded Meteorological Dataset for Serbia made by Random Forest Spatial Interpolation, Sci Data 8, 123 2021, pp. 1-12 (Year: 2021).*

(Continued)

*Primary Examiner* — Wilbert L Starks
(74) *Attorney, Agent, or Firm* — JCIP GLOBAL INC.

(57) ABSTRACT

The present invention provides a long-term streamflow forecast method and system based on process-data synergic drive. The long-term streamflow forecast method includes: step 1, collecting data; step 2, constructing a VIC model; step 3, performing interpolation, bias correction, and disaggregation to obtain daily data; step 4, by using climate model forecasts, driving the VIC model; step 5, constructing an improved VIC model by selecting grid cells from the distributed hydrological model, among which the series of monthly soil moisture forecasts in the third layer in all grid cells are treated as independent variables and the monthly streamflow of the outlet hydrological station of the studied watershed is treated as the dependent variables; step 6, driving the improved VIC model to perform the gridded runoff yield calculation of a full time period; step 7, forming a candidate predictor set; step 8, screening predictors and training a deep learning model to obtain a composite model, and performing long-term streamflow forecast.

8 Claims, 6 Drawing Sheets

(56) References Cited

OTHER PUBLICATIONS

Rajulapati et al., The Perils of Regridding: Examples Using a Global Precipitation Dataset, Journal of Applied Meteorology and Climatology, vol. 60, 2021, pp. 1561-1573 (Year: 2021).*

Wang et al., Spatial Interpolation of Daily Precipitation in a High Mountainous Watershed Based on Gauge Observations and a Regional Climate Model Simulation, Journal of Hydrometeorology, 2017, pp. 845-862 (Year: 2017).*

Semenov, et al., Spatial Interpolation of the LARS-WG Stochastic Weather Generator in Great Britain, Climate Research, vol. 11, No. 2, 1999, pp. 137-148 (Year: 1999).*

Kang Hearing Lin et al., "Study of the LSTM run off prediction model with coupled Encoder-Decoder", Engineering Journal of Wuhan University, Aug. 2022, with English translation thereof, pp. 1-22, vol. 55, No. 8.

Wenxin Xu et al., "Scale Effects of the Monthly Streamflow Prediction Using a State of the art Deep Learning Model", Water Resources Management, Jun. 20, 2022, pp. 3609-3625, vol. 36.

Hao Liang et al., "Runrunoff prediction based on multiple hybrid models", water conservancy learned journal, Jan. 2020, with English translation thereof, pp. 1-42, vol. 51, No. 1.

* cited by examiner

LONG-TERM STREAMFLOW FORECAST METHOD AND SYSTEM BASED ON PROCESS-DATA SYNERGIC DRIVE

CROSS-REFERENCE TO RELATED APPLICATION

This application claims the priority benefit of China application serial no. 202211047557.1, filed on Aug. 30, 2022. The entirety of the above-mentioned patent application is hereby incorporated by reference herein and made a part of this specification.

BACKGROUND

Technical Field

The present disclosure relates to the technical field of processing methods or systems suitable for prediction purposes, and in particular, to a long-term streamflow forecast method and system based on process-data synergic drive.

Description of Related Art

In the streamflow forecasts, the forecasts with a lead time of more than 15 days and less than 1 year are called long-term forecasts. The long-term streamflow forecast researches are mostly carried out on monthly scale. Accurate and reliable monthly streamflow forecasts are important basis and foundation for those work such as reservoir operation, water resource management, flood control and drought combat and so on. Generally, the monthly streamflow forecast models can be divided into process-driven type and data-driven type, where the process-driven model is used to assimilate the latest historical meteorological data and update and forecast, in real time, month-ahead watershed initial hydrological conditions, so as to obtain a streamflow forecast result of a specific lead time with the future meteorological forcing data (generally the climate model forecasts) as inputs of the hydrological model; the data-driven model is used to forecast future streamflows by only establishing a mapping relationship between a forecast object of a historical period and a predictor.

For the process-driven models, the accuracy of the climate model forecasts is of great importance for the performance of a forecast system. Although relevant researches show that there is a good correlation relationship between the raw forecast data of the climate model and the observation data, due to limitations of recognition of the human for the global climate system and the current computer development level, the climate model forecasts have a large bias from the observed values in regional or watershed scale, and the spatial accuracy is relatively low, failing to satisfy the input accuracy requirements of the hydrological models, especially, the distributed hydrological models. In order to solve the problem of mismatching between the output data of the climate model and the inputs of the hydrological model, a statistical downscaling method is mostly employed in the current researches to obtain grid-scale or station-scale climate model forecasts so as to drive the hydrological model and obtain a streamflow forecast result.

For the data-driven models, the selected forecast model and the type and amount of the hydrological meteorological input data corresponding to the model are decisive. The data-driven model usually includes a time series analysis method, a regression analysis method, and a machine learning method and the like. In recent years, the machine learning method draws wide attention due to its good performance in the streamflow forecast field. A deep learning algorithm using a deep neural network to simulate human thinking breaks through the limitations of poor generalization capability and ease of generation of local optimal solution and the like of a shallow machine learning model, arousing a new tide of machine learning development and drawing interests of the hydrological scholars. For example, the invention application CN201811590914.2 proposes a long and medium-term streamflow forecast method based on bidirectional long and short-term memory (BL-STM) deep learning; the invention application CN202110966434.7 proposes a real-time monthly streamflow forecast method based on a deep learning model.

As mentioned above, the existing streamflow forecast methods propose various optimizations and improvements. But, in consideration of a physical mechanism of the hydrological process, the process-driven model closely related to watershed characteristics still has the problems of excessive dependence on the accuracy of the meteorological input data, high computational costs, model complexity and uncertainties of structures and parameters and the like, and especially, those distributed hydrological models are limited in applications due to its high computer storage and running costs. In contrast, the more flexible data-driven models have the problems of poor explainability resulting from no consideration of the physical mechanism. Due to these problems, the forecast effects of the existing streamflow forecast methods are not ideal and the high-efficiency and high-accuracy streamflow forecast requirements cannot be satisfied effectively.

SUMMARY

In order to solve the above problems, the present disclosure provides to a long-term streamflow forecast method and system based on process-data synergic drive, in which a composite model with a process drive and a data drive having special effect and working collaboratively is constructed to greatly reduce computational costs and efficiently and accurately obtain streamflow forecast data.

In order to achieve the above purpose, the present disclosure employs the following solution:

The present disclosure provides a long-term streamflow forecast method based on process-data synergic drive, which includes the following steps:

at step 1, collecting streamflow data, meteorological data, climate system indices, climate model forecasts, watershed elevation data, soil data and vegetation data;

at step 2, constructing a daily-scale Variable Infiltration Capacity (VIC) distributed hydrological model of a target watershed and performing calibration and validation for model parameters;

at step 3, after spatially interpolating the climate model forecasts to a grid scale matching the VIC distributed hydrological model, firstly using a linear scaling method (LS) to perform bias correction on the climate model forecasts, and then using a k-nearest neighbor algorithm-based (KNN) model to disaggregate monthly-scale meteorological data forecast by a climate model into daily data;

at step 4, by using the spatially-interpolated and disaggregated climate model forecasts, driving the VIC distributed hydrological model to perform gridded run-off yield calculation within a calibration period;

at step 5, with the observed monthly streamflow values of the outlet hydrological station of the studied watershed within the calibration period as dependent variables and with monthly data obtained by aggregating runoff yield outputs of all grids within the watershed in different lead times as independent variables, selecting a third layer of soil moistures with the runoff yield outputs as daily scale, and using a least absolute shrinkage and selection operator (LASSO) regression model for each lead time to perform feature variable screening, and then taking the grids corresponding to the screened-out runoff yield outputs as typical grids to construct an improved VIC model;

at step 6, driving the improved VIC model with the disaggregated climate model forecasts (disaggregated climate model forecasts are also referred as bias-corrected and temporally disaggregated climate model forecasts) to perform gridded runoff yield calculation of a full time period;

at step 7, re-aggregating daily-scale gridded runoff yield calculation results of the improved VIC model into monthly-scale data and combining the monthly-scale data with historical streamflows, climate model forecasts, meteorological data and climate system indices to form a candidate predictor set of the data-driven model, wherein different lag times are to be considered for the influence of the historical streamflows, the meteorological data and the climate system indices on the forecast monthly streamflows;

at step 8, performing normalization on the candidate predictor set and the monthly streamflow data respectively and then screening predictors by using a machine learning model; then, training a deep learning model using the screened-out predictors to further obtain a composite model based on process-data synergic drive, and using the composite model to perform long-term streamflow forecast.

Furthermore, the present disclosure provides a long-term streamflow forecast method based on process-data synergic drive, the step 2 further specifically includes the following sub-steps:

at sub-step 2.1, performing grid division on the target watershed and preparing a longitude and latitude coordinate file of a grid center;

at sub-step 2.2, preparing a ratio file of a watershed-covered area in each grid, a region flow direction file, a soil data file and a land utilization input file;

at sub-step 2.3, interpolating the daily-scale meteorological observation data of the watershed to a grid scale to obtain a meteorological forcing input file;

at sub-step 2.4, after performing trial operation on the VIC distributed hydrological model based on default initial parameters, with a Nash-Sutcliffe efficiency coefficient and a relative error of a total streamflow as a target function, performing calibration on runoff generation and routing parameters of the watershed.

Furthermore, the present disclosure provides a long-term streamflow forecast method based on process-data synergic drive, the step 3 comprises the following sub-steps:

at sub-step 3.1, interpolating the observation data and the climate model forecasts to a grid scale matching the VIC distributed hydrological model;

at sub-step 3.2, taking a ratio of a mean value of the meteorological data forecasted by the climate model for the months of multiple years and a mean value of the observed meteorological data as a correction factor to perform bias correction on precipitation and maximum and minimum air temperatures forecast by the climate model respectively; if precipitation of an r-th month of a year with a lead time of s months is to be corrected, performing correction in the formula: $M_{cor}(s)=M(s)\times(\overline{M}_{obs,r}/\overline{M}_{pred,r})$; if maximum and minimum air temperatures of an r-th month of a year with a lead time of s months are to be corrected, performing correction in the formula $M_{cor}(s)=M(s)+(\overline{M}_{obs,r}/\overline{M}_{pred,r})$; wherein, $M_{cor}(s)$ is corrected forecast data, $M(s)$ represents raw forecast data to be corrected, $\overline{M}_{obs,r}$ represents a mean value of the observation data, and $\overline{M}_{pred,r}$ represents a mean value of the forecast data;

at sub-step 3.3, by using Gram-Schmidt orthogonalization method, transforming the observed meteorological data X of a historical period into an orthogonal matrix Y in the formula Y=RX, where R is a rotation matrix;

at sub-step 3.4, calculating an Euclidean distance between the forecast monthly meteorological data to be disaggregated and the observed monthly meteorological data for the historical period, and then selecting K pieces of monthly data with minimum distance and assigning weights in the formula:

$$W(k) = 1/k \sum_{u=1}^{K} \frac{1}{u}, \text{ wherein } k = 1, 2, \ldots, K;$$

at sub-step 3.5, using these weights as a probabilistic metric to construct one-dimensional matrix y* of the disaggregated forecast data;

at sub-step 3.6, transforming the matrix y* back to an initial space to obtain the daily-scale climate model forecasts x* in the formula $x^*=R^T y^*$, wherein $R^T$ is a transpose matrix of R.

Furthermore, the present disclosure provides a long-term streamflow forecast method based on process-data synergic drive, the step 5 comprising the following sub-steps:

at sub-step 5.1, extracting observed daily streamflow values of the outlet hydrological station within the calibration period and the runoff yield outputs of all grids within the watershed in different lead times; aggregating the streamflows and the runoff yield outputs into monthly data and then performing normalization to eliminate a dimensional influence between the variables;

at sub-step 5.2, with the monthly streamflow values as dependent variables and with the runoff yield outputs of the grids as independent variables, using the LASSO regression model to perform feature variable screening, wherein a target function set in the form of least square is $\min\{\Sigma_{i=1}^{m}(y_i-\beta_0-\Sigma_{j=1}^{n}x_{ij}\beta_j)+\lambda\Sigma_{j=1}^{n}|\beta_j|\}$; in the formula, x and y correspond to the independent variables and the dependent variables respectively, m corresponds to a dependent variable series length, n corresponds to a number of grids of the target watershed, $\beta_0$ is a constant item, $\beta$ is a coefficient of each variable, $\lambda$ is a penalty parameter; taking the grids corresponding to the screened-out runoff yield outputs as typical grids.

Furthermore, the present disclosure provides a long-term streamflow forecast method based on process-data synergic drive, the step 8 comprises the following sub-steps:

at sub-step 8.1, stacking two layers of restricted Boltzmann machine and one layer of back propagation neural network into a deep belief network model;

at sub-step 8.2, training the constructed deep belief network model, including two steps of unsupervised pre-training and supervised fine-tuning.

Furthermore, the present disclosure provides a long-term streamflow forecast method based on process-data synergic drive, in the sub-step 8.1, the restricted Boltzmann machine is formed by a visible layer v and a hidden layer h, wherein there is no intra-layer connection but inter-layer full connection in the network of the restricted Boltzmann machine; for one set of given states (v,h), a jointly-configured energy function of a visible unit and a hidden unit is based on the formula: $E(v, h|\theta) = -\Sigma_{p=1}^{V}\Sigma_{q=1}^{H} v_p w_{pq} h_q - \Sigma_{p=1}^{V} b_p v_p - \Sigma_{q=1}^{H} c_q h_q$; in the formula, θ represents a parameter {w,b,c} of the restricted Boltzmann machine, $w_{pq}$ is a connection weight between a p-th visible unit and a q-th hidden unit, $b([b_1, \ldots, b_V])$ and $c([c_1, \ldots, c_H])$ are respective bias vectors of the p-th visible unit and the q-th hidden unit, and V and H represent a number of neuron nodes of the visible layer and the hidden layer respectively.

Furthermore, the present disclosure provides a long-term streamflow forecast method based on process-data synergic drive, in the sub-step 8.2, the pre-training process is a down-top training performed based on a greedy layer-wise contrastive divergence algorithm (CD) of the restricted Boltzmann machine; after a first restricted Boltzmann machine is trained, an input of a next restricted Boltzmann machine is an output of the current restricted Boltzmann machine, and thus layer-wise transfer is carried out by repeating the training to further optimize the parameters of the model, so as to minimize the error function and achieve local optimum; the reverse fine-tuning process is that, at a last layer of the restricted Boltzmann machine, training errors are propagated to the layer of the restricted Boltzmann machine from top down by using the supervised learning method of the back propagation neural network, and then the entire restricted Boltzmann machine is fine-tuned to achieve global optimum.

Furthermore, the present disclosure provides a long-term streamflow forecast system based on process-data synergic drive, comprising:
  a collecting part, configured to collect streamflow data, meteorological data, climate system indices, climate model forecasts, watershed elevation data, soil data and vegetation data;
  a calibrating and validating part, configured to construct a daily-scale Variable Infiltration Capacity (VIC) distributed hydrological model of a target watershed and perform calibration and validation for model parameters;
  a correcting and disaggregating part, configured to, after the climate model forecasts are spatially interpolated to a grid scale matching the VIC distributed hydrological model, firstly use a linear scaling method to perform bias correction on the climate model forecasts, and then use a k-nearest neighbor algorithm-based model to disaggregate monthly-scale meteorological data forecast by a climate model into daily data;
  a calibration period runoff yield calculation part, configured to, by using the spatially-interpolated and disaggregated climate model forecasts, drive the VIC distributed hydrological model to perform gridded runoff yield calculation within a calibration period;
  an improving part, configured to, with observed monthly streamflow values of an outlet hydrological station within the calibration period as dependent variables and with monthly data obtained by aggregating runoff yield outputs of all grids within the watershed in different lead times as independent variables, select a third layer of soil moistures with the runoff yield outputs as daily scale, and use a LASSO regression model to perform feature variable screening, and then take the grids corresponding to the screened-out runoff yield outputs as typical grids to construct an improved VIC model;
  a full time period runoff yield calculation part, configured to drive the improved VIC model with the disaggregated climate model forecasts to perform gridded runoff yield calculation of a full time period;
  a candidate predictor obtaining part, configured to re-aggregate daily-scale gridded runoff yield calculation results of the improved VIC model into monthly-scale data and combine the monthly-scale data with historical streamflows, climate model forecasts, meteorological data and climate system indices to form a candidate predictor set of the data-driven model, wherein different lag times are to be considered for the influence of the historical streamflows, the meteorological data and the climate system indices on the forecast monthly streamflows;
  a composite model forming part, configured to perform normalization on the candidate predictor set and the monthly streamflow data respectively and then screen predictors by using a machine learning model; then, train a deep learning model using the screened-out predictors to further obtain a composite model based on process-data synergic drive;
  a streamflow forecasting part, configured to use the composite model based on process-data synergic drive to perform long-term streamflow forecast;
  a controlling part, configured to communicate with the collecting part, the calibrating and validating part, the correcting and disaggregating part, the calibration period runoff yield calculation part, the improving part, the full time period runoff yield calculation part, the candidate predictor obtaining part, the composite model forming part, and the streamflow forecasting part respectively to control operations thereof;
  wherein, in the improving part, the observed daily streamflow values of the outlet hydrological station within the calibration period and the runoff yield outputs of all grids within the watershed in different lead times are firstly extracted; then, normalization is performed on monthly data obtained by aggregating both the streamflows and the runoff yield outputs to eliminate a dimensional influence between the variables; with the monthly streamflow values as dependent variables and the runoff yield outputs of the grids as independent variables, the LASSO regression model is used to perform feature variable screening, wherein a target function set in the form of least square is:

$$\min\{\Sigma_{i=1}^{m}(y_i - \beta_0 - \Sigma_{j=1}^{n} x_{ij}\beta_j) + \lambda\Sigma_{j=1}^{n}|\beta_j|\}$$

in the formula, x and y correspond to the independent variables and the dependent variables respectively, m corresponds to a dependent variable series length, n corresponds to a number of grids of the target watershed, $\beta_0$ is a constant item, β is a coefficient of each variable, λ is a penalty parameter; the grids corresponding to the screened-out runoff yield outputs are taken as typical grids.

Furthermore, the present disclosure provides a long-term streamflow forecast system based on process-data synergic drive, comprising: an input displaying part, configured to communicate with the collecting part, the calibrating and validating part, the correcting and disaggregating part, the calibration period runoff yield calculation part, the improving part, the full time period runoff yield calculation part, the candidate predictor obtaining part, the composite model forming part, and the streamflow forecasting part and the controlling part respectively to allow a user to input an operation instruction and perform corresponding displaying.

In the long-term streamflow forecast method and system based on process-data synergic drive provided by the embodiments of the present disclosure, with the observed monthly streamflow values of the outlet hydrological station of the studied watershed within a calibration period as dependent variables, and with monthly data obtained by aggregating the runoff yield outputs of all grids within the watershed in different lead times as independent variables, the third layer of soil moisture with the runoff yield outputs as daily scale is selected; and a LASSO regression model is used for each lead time to perform feature variable screening, and then the grids corresponding to the screened-out runoff yield outputs are taken as typical grids to construct an improved VIC model; the bias-corrected and temporally disaggregated climate model forecasts are used to drive the improved VIC model to perform gridded runoff yield calculation of a full time period; then, the results are re-aggregated to form a candidate predictor set of the data-driven model, and then screening and training are performed to obtain a composite model based on process-data synergic drive. The constructed composite model is more highly adapted to the watershed and can be applied in a broader scope. Further, the composite model has faster processing speed, which greatly reduces the computation costs and model structure complexity of the distributed hydrological model, and lowers the computer storage and running costs. Finally, a more accurate forecast result can be obtained and thus the optimal forecast effect can be achieved with minimum computational resources.

DESCRIPTION OF THE EMBODIMENTS

The specific implementation solutions of the long-term streamflow forecast method and system based on process-data synergic drive according to the present disclosure will be described in details below in combination with accompanying drawings.

Figure 1:
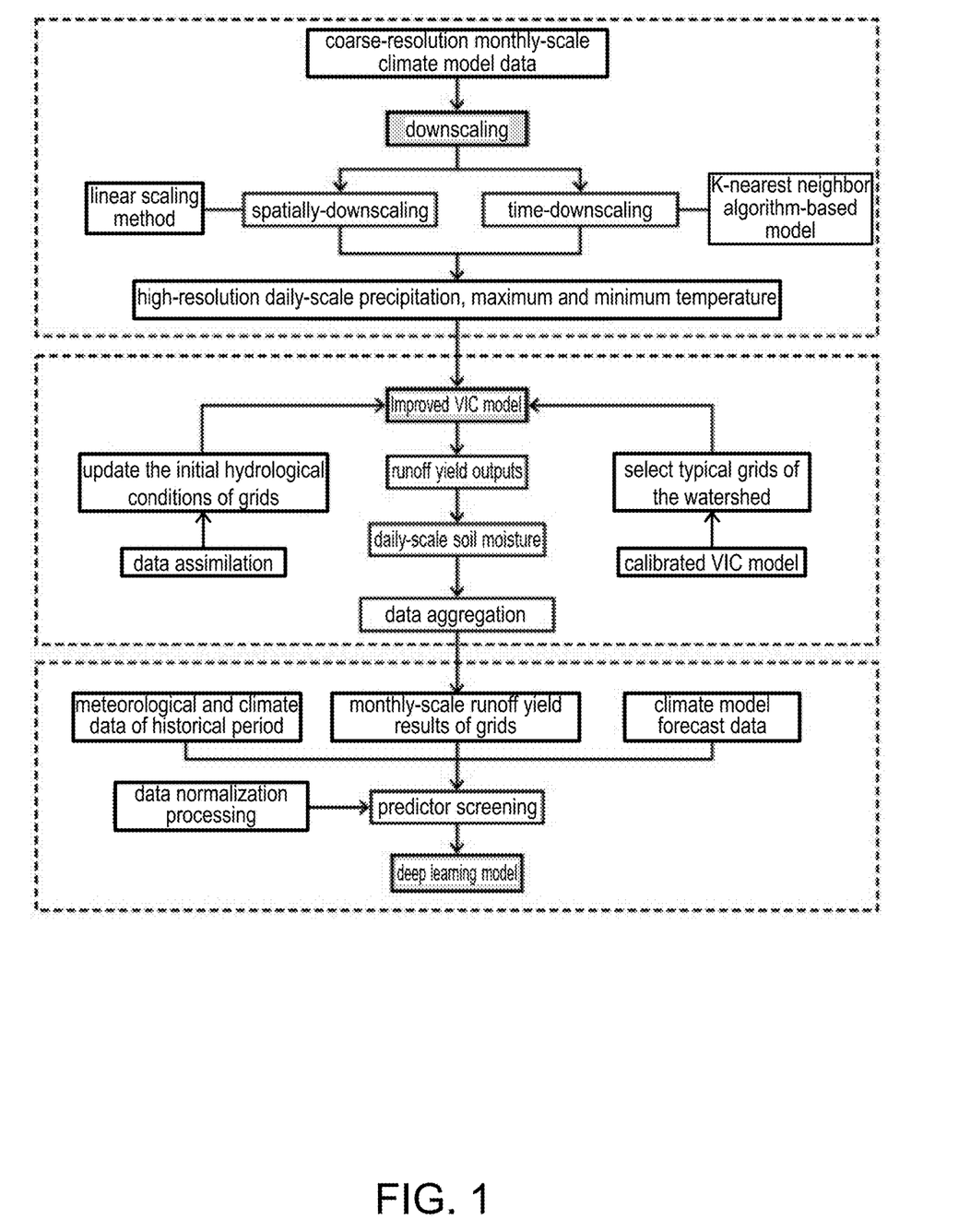
FIG. 1 is a flowchart illustrating a long-term streamflow forecast method based on process-data synergic drive according to an embodiment of the present disclosure.

As shown in FIG. 1, the long-term streamflow forecast method based on process-data synergic drive according to one or more embodiments of the present disclosure includes the following steps.

At step 1, streamflow data, meteorological data, climate system indices, climate model forecasts, watershed elevation data, soil data and vegetation data are collected.

In a specific implementation, the streamflow data used in this embodiment comes from the hydrological yearbook of the People's Republic of China: the hydrological data of Yangtze River watershed, covering the period of 1980 to 2010; the meteorological data is downloaded from National Climate Center of China Meteorological Administration, covering the period of 1982 to 2010; the climate system indices are downloaded from National Oceanic and Atmospheric AdministrationEarth System Research Laboratory (NOAA-ESRL) with the official website being (http://www.esrl.noaa.gov/psd/data/climateindices/list/) as shown in Table 1, covering the period of 1982 to 2010; the climate model forecasts come from the data of the monthly-scale precipitation and maximum and minimum temperatures released by the meteorological forecast system SEAS5 developed by European Centre for Medium-Range Weather Forecasts (ECMWF), covering the period of 1982 to 2010; the watershed elevation data comes from the global land DEM data with a resolution of 30 arc seconds established by the EROS data center of United States Geological Survey (USGS); the soil data comes from the global soil data released by Food and Agriculture Organization of the United Nations (FAO); and the vegetation data comes from the land cover data of global 1 km developed by USA Maryland University.

TABLE 1

Information of selected 16 climate system indices

| Name | Description |
| --- | --- |
| PNA | Pacific North American Index |
| WP | Western Pacific Index |
| NAO | North Atlantic Oscillation |
| SOI | Southern Oscillation Index |
| WHWP | Western Hemisphere Warm Pool |
| ONI | Oceanic Niño Index |
| MEI | Multivariate El Niño/Southern Oscillation (ENSO) Index |
| Niño 1 + 2 | Extreme Eastern Tropical Pacific SST (0-10S) (90W-80W) |
| Niño 3 | Eastern Tropical Pacific SST (5N-5S) (150W-90W) |
| Niño 3.4 | East Central Tropical Pacific SST (5N-5S) (170-120W) |
| Niño 4 | Central Tropical Pacific SST (5N-5S) (160E-150W) |
| TNI | Indices of El Niño Evolution |
| AO | Arctic Oscillation |
| QBO | Quasi-Biennial Oscillation |
| CENSO | Bivariate ENSO Time series |
| EPO | East Pacific/North Pacific Oscillation |

At step 2, a Variable Infiltration Capacity (VIC) of the target watershed is constructed, and calibration and validation of model parameters are performed. The step 2 further includes the following sub-steps.

At sub-step 2.1, grid division is performed on the target watershed, and a longitude and latitude coordinate file of a grid center is prepared.

Figure 2:
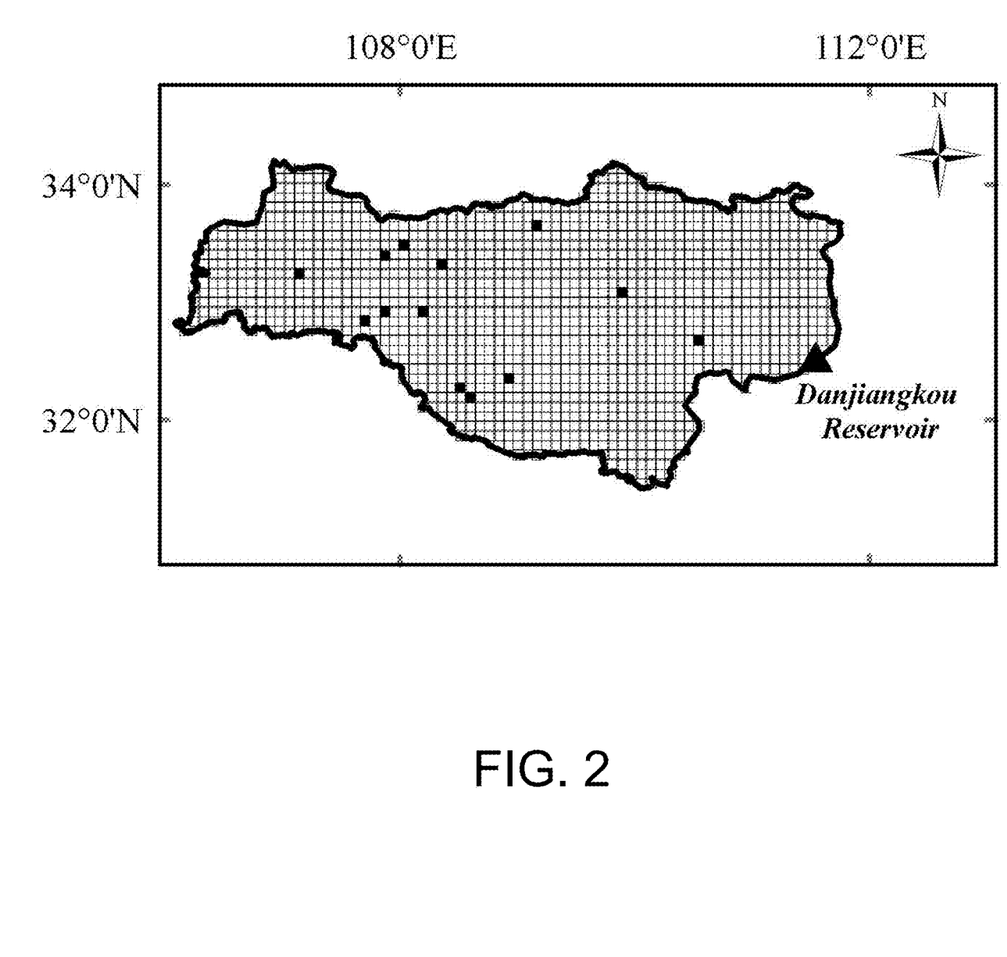
FIG. 2 is a schematic diagram illustrating typical grids of a target watershed according to an embodiment of the present disclosure.

Specifically, in this embodiment, with the upper reaches of the Danjiangkou Reservoir as the target watershed, the watershed is divided into 1382 grids with a resolution of 0.081°×0.081° as shown in FIG. 2.

At sub-step 2.2, a ratio file of a watershed-covered area in each grid, a region flow direction file, a soil data file and a land utilization input file are prepared.

At sub-step 2.3, the daily-scale meteorological observation data of the watershed is interpolated to a grid scale to obtain a meteorological forcing input file.

At sub-step 2.4, after trial operation is performed on the VIC model (also referred as VIC distributed hydrological model) based on default initial parameters, with a Nash-Sutcliffe efficiency coefficient and a relative error of a total streamflow as a target function, calibration on runoff generation and routing parameters of the watershed is performed.

In the present embodiment, the calibration and validation are performed with the inflow hydrological station of the Danjiangkou Reservoir as the outlet hydrological station.

At step 3, after the climate model forecasts are spatially interpolated to a grid scale matching the VIC model, a linear scaling (LS) method is firstly used to perform bias correction on the climate model forecasts, and then a k-nearest neighbor algorithm (KNN)-based model is used to disaggregate monthly-scale meteorological data forecasted by a climate model into daily data by time downscaling. The step 3 further includes the following sub-steps.

At sub-step 3.1, the observation data and the climate model forecasts are interpolated to a grid scale matching the VIC model.

In a specific implementation, in this embodiment, the station-scale meteorological observation data and the climate model forecasts with a spatial resolution of 1°×1° are interpolated to a grid scale with a spatial resolution of 0.081°×0.081°, where the period is 1983 to 2010.

At sub-step 3.2, a ratio of a mean value of the meteorological data forecasted by the climate model for the months of multiple years and a mean value of the observed meteorological data is taken as a correction factor, to perform bias correction on precipitation and maximum and minimum air temperatures forecast by the climate model respectively.

If the precipitation of an r-th month of a year with a lead time of s months is to be corrected, correction is performed in the formula:

$$M_{cor}(s) = M(s) \times (\overline{M}_{obs,r} / \overline{M}_{pred,r}) \quad (1)$$

If the maximum and minimum air temperatures of an r-th month of a year with a lead time of s months are to be corrected, correction is performed in the formula:

$$M_{cor}(s) = M(s) + (\overline{M}_{obs,r} / \overline{M}_{pred,r}) \quad (2)$$

in the formula: $M_{cor}(s)$ is corrected forecast data, $M(s)$ represents raw forecast data to be corrected, $\overline{M}_{obs,r}$ represents a mean value of the observation data, and $\overline{M}_{pred,r}$ represents a mean value of the forecast data.

In this embodiment, the period of 1983 to 2000 is selected as the calibration period for bias correction, and the period of 2001 to 2010 is selected as the validation period.

At sub-step 3.3, by using Gram-Schmidt orthogonalization method, the observed meteorological data X of a historical period is transformed into an orthogonal matrix Y in the formula Y=RX, wherein R is a rotation matrix.

At sub-step 3.4, an Euclidean distance between the forecast monthly meteorological data to be disaggregated and the observed monthly meteorological data for the historical period is calculated, and then K pieces of monthly data with minimum distance are selected and assigned weights in the formula:

$$W(k) = 1/k \sum_{u=1}^{K} \frac{1}{u} \quad (3)$$

wherein, k=1, 2, ..., K.

At sub-step 3.5, these weights are used as a probabilistic metric to construct a one-dimensional matrix y* of the disaggregated forecast data.

At sub-step 3.6, the matrix y* is transformed back to an initial space to obtain the daily-scale climate model forecasts x* in the formula:

$$x^* = R^T y^* \quad (4)$$

wherein $R^T$ is a transpose matrix of R.

In the present embodiment, the observed meteorological data of 1983 to 2000 is selected as the observed meteorological data set of the historical period; when the forecast monthly meteorological data of 1983 to 2000 is disaggregated, the precipitation data is scaled in the same scaling factor as the observation data, and the temperature data is scaled in the same scaling distance as the observation data; when the forecast monthly meteorological data of 2001 to 2010 was disaggregated, the k-nearest neighbor algorithm (KNN)-based model is employed. In other words, the steps 3.3 to 3.6 are performed.

At step 4, by using the spatially-interpolated and time-downscaled climate model forecasts (time-downscaled climate model forecasts are also referred as disaggregated climate model forecasts), the VIC model is driven to perform gridded runoff yield calculation within a calibration period. In this embodiment, the calibration period is 1983 to 2000.

At step 5, with observed monthly streamflow values of an outlet hydrological station within the calibration period as dependent variables and with monthly data obtained by aggregating runoff yield outputs of all grids within the watershed in different lead times as independent variables, a LASSO regression model is used to perform feature variable screening, and then the grids corresponding to the screened-out runoff yield outputs are taken as typical grids to construct an improved VIC model. The step 5 includes the following sub-steps.

At sub-step 5.1, observed daily streamflow values of the outlet hydrological station within the calibration period and the runoff yield outputs of all grids within the watershed in different lead times are extracted, where a third layer of soil moistures with the runoff yield outputs as daily scale is selected; the streamflows and the runoff yield outputs are both aggregated into monthly data and then normalized to eliminate a dimensional influence between the variables.

At sub-step 5.2, with the monthly streamflow values as dependent variables and with the runoff yield outputs of the grids as independent variables, the LASSO regression model is used to perform feature variable screening, wherein a target function set in the form of least square is:

$$\min \left\{ \sum_{i=1}^{m} \left( y_i - \beta_0 - \sum_{j=1}^{n} x_{ij} \beta_j \right) + \lambda \sum_{j=1}^{n} |\beta_j| \right\} \quad (4)$$

in the formula, x and y correspond to the independent variables (runoff yield outputs) and the dependent variables (observed streamflows) respectively, m corresponds to a dependent variable series length, n corresponds to a number of grids of the target watershed, $\beta_0$ is a constant item, $\beta$ is a coefficient of each variable, $\lambda$ is a penalty parameter; the grids corresponding to the screened-out runoff yield outputs are collectively taken as typical grids.

In this embodiment, the data of the third layer of soil moisture of all grids within the watershed with a lead time of 1 month is extracted, and with the data as independent variables, a total of 14 typical grids are screened out, which correspond to the all-black grids in FIG. 2. Moreover, the grid properties of the improved VIC model can be seen in Table 2.

TABLE 2

Grid properties of the improved VIC model

| Number | Latitude (°N) | Longtitude (°E) | Main vegetation | Topsoil | Subsoil |
|---|---|---|---|---|---|
| 1 | 32.84 | 107.70 | Evergreen Needleleaf | Loam | Clay loam |
| 2 | 32.92 | 107.87 | Mixed Cover | Loam | Clay loam |
| 3 | 33.65 | 109.16 | Crop land | Loam | Clay loam |
| 4 | 33.40 | 107.87 | Evergreen Needleleaf | Loam | Clay loam |
| 5 | 33.08 | 109.89 | Wooded Grasslands | Loam | Clay loam |
| 6 | 32.67 | 110.54 | Woodland | Loam | Clay loam |
| 7 | 32.19 | 108.60 | Deciduous Broadleaf | Clay loam | Clay |
| 8 | 33.32 | 108.35 | Wooded Grasslands | Loam | Clay loam |
| 9 | 32.67 | 107.46 | Mixed Cover | Clay loam | Clay |
| 10 | 32.35 | 108.92 | Deciduous Broadleaf | Loam | Clay loam |
| 11 | 33.48 | 108.03 | Wooded Grasslands | Loam | Clay loam |
| 12 | 32.27 | 108.51 | Deciduous Broadleaf | Clay loam/ Loam | Clay loam/ Clay |
| 13 | 33.24 | 107.14 | Crop land | Loam | Clay loam |
| 14 | 32.92 | 108.19 | Woodland | Loam | Clay loam |

At step 6, the improved VIC model is driven with the spatio-temporally-downscaled climate model forecasts (also referred as disaggregated climate model forecasts) to perform gridded runoff yield calculation of a full time period. In this embodiment, the full time period is 1983 to 2010.

At step 7, daily-scale gridded runoff yield calculation results of the improved VIC model are re-aggregated into monthly-scale data and the monthly-scale data is combined with historical streamflows, climate model forecasts, meteorological data and climate system indices to form a candidate predictor set of the data-driven model, wherein different lag times are to be considered for the influence of the historical streamflows, the meteorological data and the climate system indices on the forecast monthly streamflows.

Figure 3:
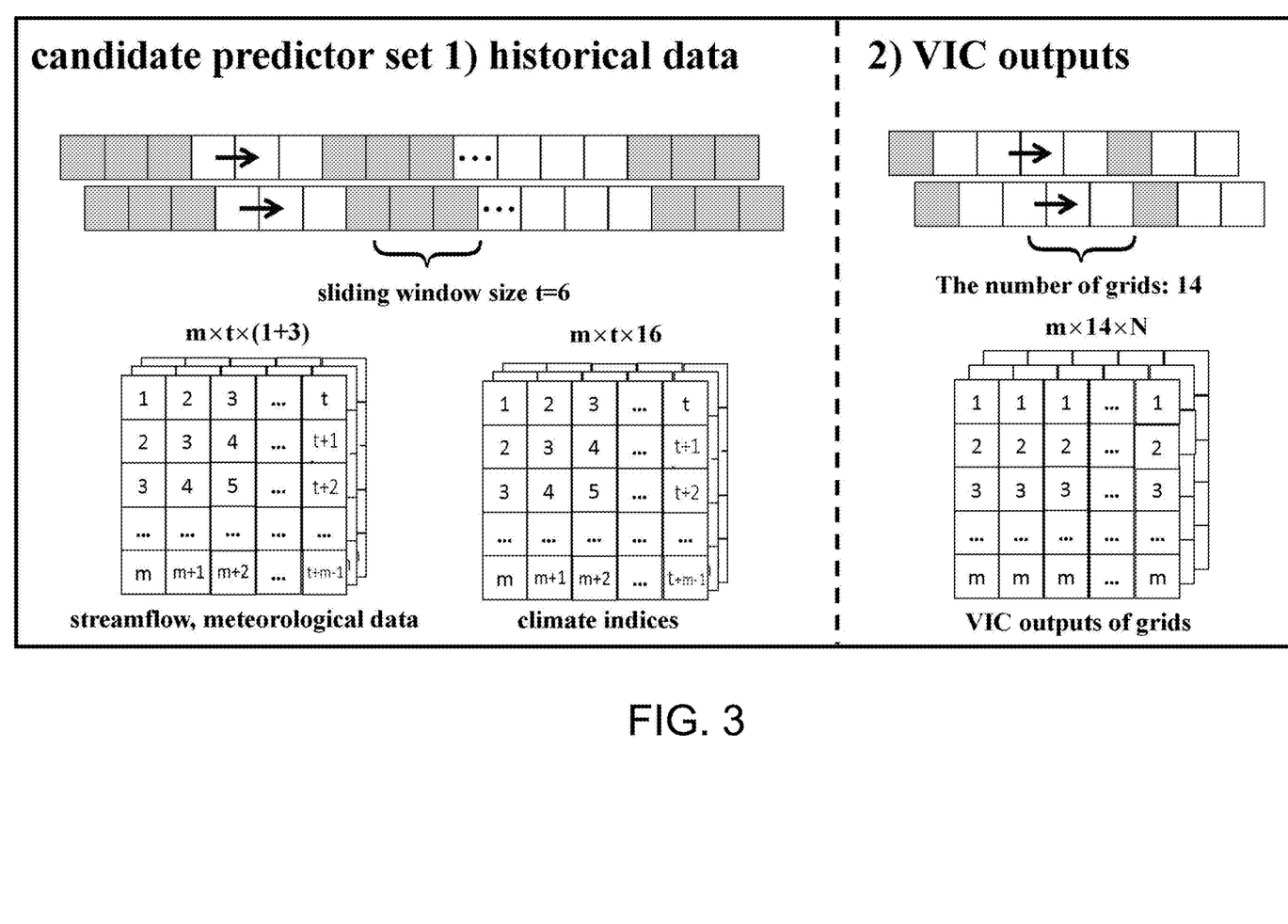
FIG. 3 is a schematic diagram illustrating input data of a deep learning model according to an embodiment of the present disclosure.
Figure 4:
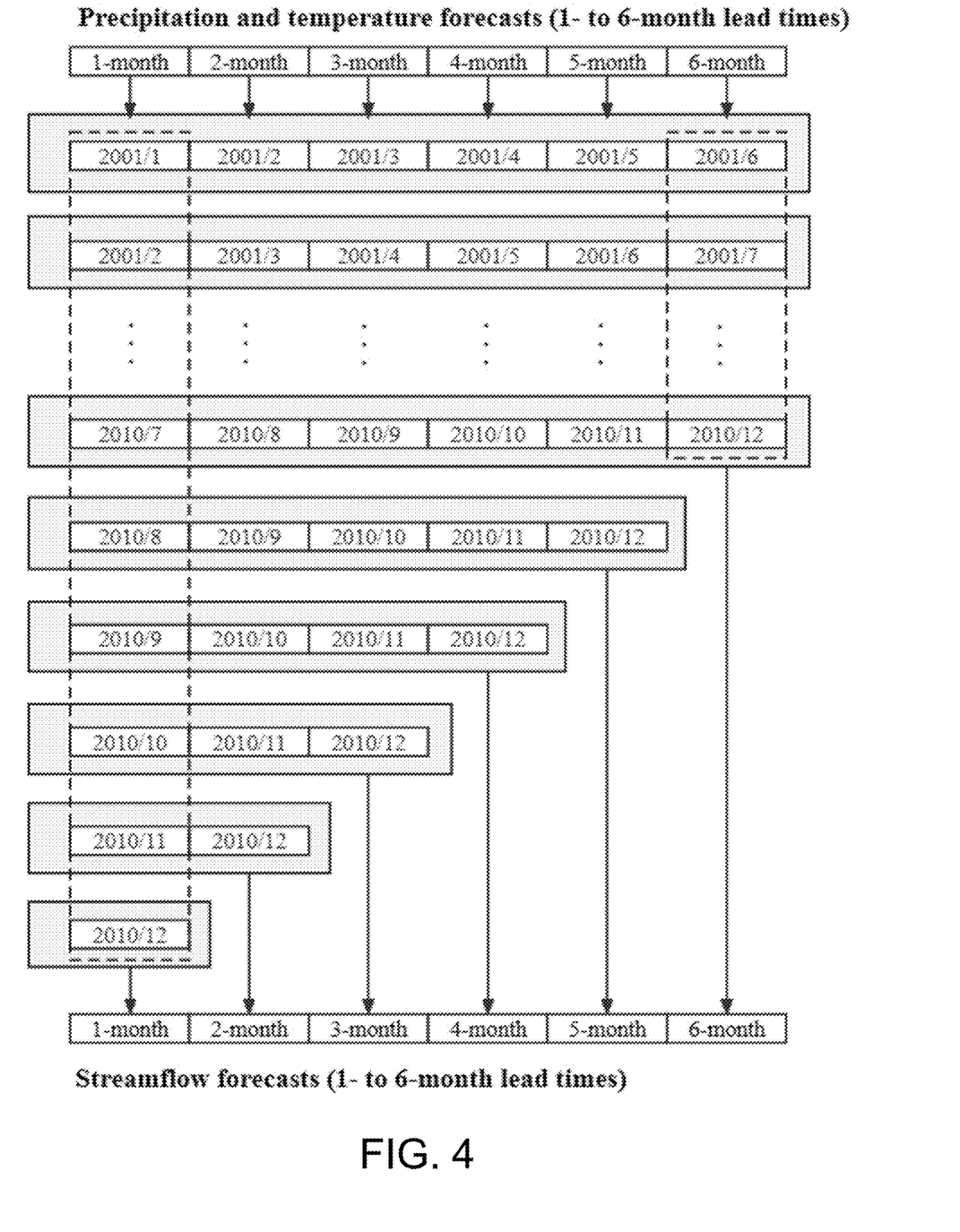
FIG. 4 is an illustrative diagram of monthly streamflow rolling forecasts according to an embodiment of the present disclosure.

In this embodiment, the series time period of the monthly streamflow data (dependent variables) of a training period is 1983 to 2000, with a length m being 216 months. The candidate predictor set selected as shown in FIG. 3 includes two parts: historical data, climate model forecasts and grid point runoff yield outputs. The historical data includes previous streamflows, watershed meteorological data (precipitation, maximum and minimum temperatures), and 16 climate system indices. The lag time t of the influence of the historical data on the forecast monthly streamflows is 6 months, which corresponds to the size of the sliding window in FIG. The grid point runoff yield outputs are the data of the third layer of soil moisture obtained by driving the improved VIC model with N climate models. In this embodiment, only one climate model is selected. FIG. 4 shows an illustration of the monthly streamflow rolling forecasts in the embodiment. With Jan. 1, 2001 as a forecast start point, the streamflows of January 2001 to June, 2001 with a corresponding lead time of 1 to 6 months are forecasted. The inputs corresponding to the process-driven model are the climate model forecast meteorological data with a lead time of 1 to 6 months. In this embodiment, the predictors come from five sources including three pieces of historical data, namely, the historical streamflows, the meteorological data, and the climate system indices; and two pieces of forecast data, namely, the climate model forecast meteorological data and the forecast data of the third layer of soil moisture of the typical grids, totaling 31 combinations as shown in Table 3. If the sources of the predictor data include the forecast data of the third layer of soil moisture of the typical grids, the deep learning models with the predictor combination as input are composite models which are indicated in bold words in Table, totaling 16 models (A5, B4, B7, B9, B10, C3, C5-C6, C8-C10, D1-D4, E1), and otherwise, they are only general deep learning models, totaling 16 models (A1-A4, B1-B3, B5-B6, B8, C1-C2, C4, C7, D5). The predictor combination of the invention application CN201811590914.2 in the background part corresponds to the general deep learning model B1, and the predictor combination of the invention application CN202110966434.7 in the background part corresponds to the general deep learning model with another number. It can be seen that the inputs of the present disclosure are completely different from the prior arts.

TABLE 3

Thirty-one predictor combinations.

| Number | Predictor combinations |
|---|---|
| A1 | Streamflow observations |
| A2 | Local meteorological data |
| A3 | Climate system indices |
| A4 | Climate model forecasts |
| A5 | Model-simulated soil moisture |
| B1 | Streamflow observations and local meteorological data |
| B2 | Streamflow observations and climate system indices |
| B3 | Streamflow observations and climate model forecasts |
| B4 | Streamflow observations and model-simulated soil moisture |
| B5 | Local meteorological data and climate system indices |
| B6 | Local meteorological data and climate model forecasts |
| B7 | Local meteorological data and model-simulated soil moisture |
| B8 | Climate system indices and climate model forecasts |
| B9 | Climate system indices and model-simulated soil moisture |
| B10 | Climate model forecasts and model-simulated soil moisture |
| C1 | Streamflow observations, meteorological data, and climate indices |
| C2 | Streamflow observations, meteorological data, and climate model forecasts |
| C3 | Streamflow observations, meteorological data, and model-simulated soil moisture |
| C4 | Streamflow observations, climate system indices, and climate model forecasts |

TABLE 3-continued

Thirty-one predictor combinations.

| Number | Predictor combinations |
|---|---|
| C5 | Streamflow observations, climate indices, and model-simulated soil moisture |
| C6 | Streamflow observations, climate model forecasts, and model-simulated soil moisture |
| C7 | Local meteorological data, climate system indices, and climate model forecasts |
| C8 | Local meteorological and large-scale climate data, model-simulated soil moisture |
| C9 | Local meteorological data, climate model forecasts, and model-simulated soil moisture |
| C10 | Climate system indices, climate model forecasts, and model-simulated soil moisture |
| D1 | Meteorological and climate data, climate model forecasts, model-simulated soil moisture |
| D2 | Streamflow and climate data, climate model forecasts, model-simulated soil moisture |
| D3 | Streamflow and meteorological data, climate model forecasts, model-simulated soil moisture |
| D4 | Streamflow, meteorological and climate data, model-simulated soil moisture |
| D5 | Streamflow, meteorological and climate data, climate model forecasts |
| E | Five types of data sources |

At step 8, normalization is performed on the candidate predictor set and the monthly streamflow data respectively and then predictors are screened by using a machine learning model; then, a deep learning model is trained using the screened-out predictors to further obtain a composite model based on process-data synergic drive for long-term streamflow forecast. The step 8 further includes the following sub-steps.

At sub-step 8.1, two layers of restricted Boltzmann machine (RBM) and one layer of back propagation (BP) neural network are stacked into a deep belief network model (DBN). The RBM is formed by a visible layer v and a hidden layer h, wherein there is no intra-layer connection but inter-layer full connection in the RBM network; for one set of given states (v,h), a jointly-configured energy function of a visible unit and a hidden unit is based on the formula:

$$E(v, h \mid \theta) = -\sum_{p=1}^{V}\sum_{q=1}^{H} v_p w_{pq} h_q - \sum_{p=1}^{V} b_p v_p - \sum_{q=1}^{H} c_q h_q \quad (6)$$

in the formula, $\theta$ represents a parameter $\{w,b,c\}$ of the RBM, $w_{pq}$ is a connection weight between a p-th visible unit and a q-th hidden unit, $b([b_1, \ldots, b_V])$ and $c([c_1, \ldots, c_H])$ are respective bias vectors of the p-th visible unit and the q-th hidden unit, and V and H represent a number of neuron nodes of the visible layer and the hidden layer respectively.

At sub-step 8.2, the constructed deep belief network model is trained based on two steps of unsupervised pre-training and supervised fine-tuning. The pre-training process is a down-top training performed based on a greedy layer-wise contrastive divergence (CD) algorithm of the RBM; after a first RBM is trained, an input of a next RBM is an output of the current RBM, and thus a layer-wise transfer is carried out by repeating the training to further optimize the parameters of the model, so as to minimize the error function and achieve local optimum; the reverse fine-tuning process is that, at a last layer of the RBM, training errors are propagated to the layer of RBM from top down by using the supervised learning method of the BP neural network, and then the entire RBM is fine-tuned to achieve global optimum.

In the present embodiment, a mean square error (MSE) is selected as a loss function, and a Sigmoid function is selected as an activation function. The learning rates for the pre-training and reverse fine-tuning for the deep belief network model are respectively set to 0.01 and 0.1. The number of the batch processing samples and the working epochs of the learning algorithm in the entire training dataset are both set to 100.

Furthermore, the long-term streamflow forecast method based on process-data synergic drive as provided by the embodiments of the present disclosure and the most advanced technologies in the prior arts are used for streamflow forecast and then their forecast results are compared as below.

(1) Running time: in this embodiment, when one monthly streamflow forecast is performed, the running time of the composite model for the long-term streamflow forecast method of the present disclosure is about 1 minute which is comparable to the running time of the model driven by data alone, and the running time of the process-driven model is about 51 minutes.

(2) Forecast effect: in this embodiment, the performance of the long-term streamflow forecast method is evaluated by using the following three indices, where the formulas are shown below:

$$KGE = 1 - \sqrt{(\rho - 1)^2 + (\beta - 1)^2 + (\gamma - 1)^2} \quad (7)$$

$$R^2 = \frac{\left(\sum_{i=1}^{n}(Q_{oi} - \overline{Q}_o)(Q_{si} - \overline{Q}_s)\right)^2}{\sum_{i=1}^{n}(Q_{oi} - \overline{Q}_o)^2 \sum_{i=1}^{n}(Q_{si} - \overline{Q}_s)^2} \quad (8)$$

$$WI = 1 - \frac{\sum_{i=1}^{n}(Q_{si} - Q_{oi})^2}{\sum_{i=1}^{n}(|Q_{si} - \overline{Q}_o| + |Q_{oi} - \overline{Q}_o|)^2} \quad (9)$$

in the formulas, Q represents a monthly streamflow, $\overline{Q}$ represents a mean value of the monthly streamflows, the subscripts s and o represent a forecast value and an observed value respectively, as well as a Pearson correlation coefficient between the forecast value and the observed value, $\beta$ represents a ratio of the forecast value to the observed value, $\gamma$ represents a ratio of the forecast value to a standard deviation of the observed value; the closer the KGE, $R^2$ and WI are to 1, the better the forecast effect is.

The improvement effect of the forecast performance of the method employed in the present disclosure will be described below with diagrams.

Figure 5:
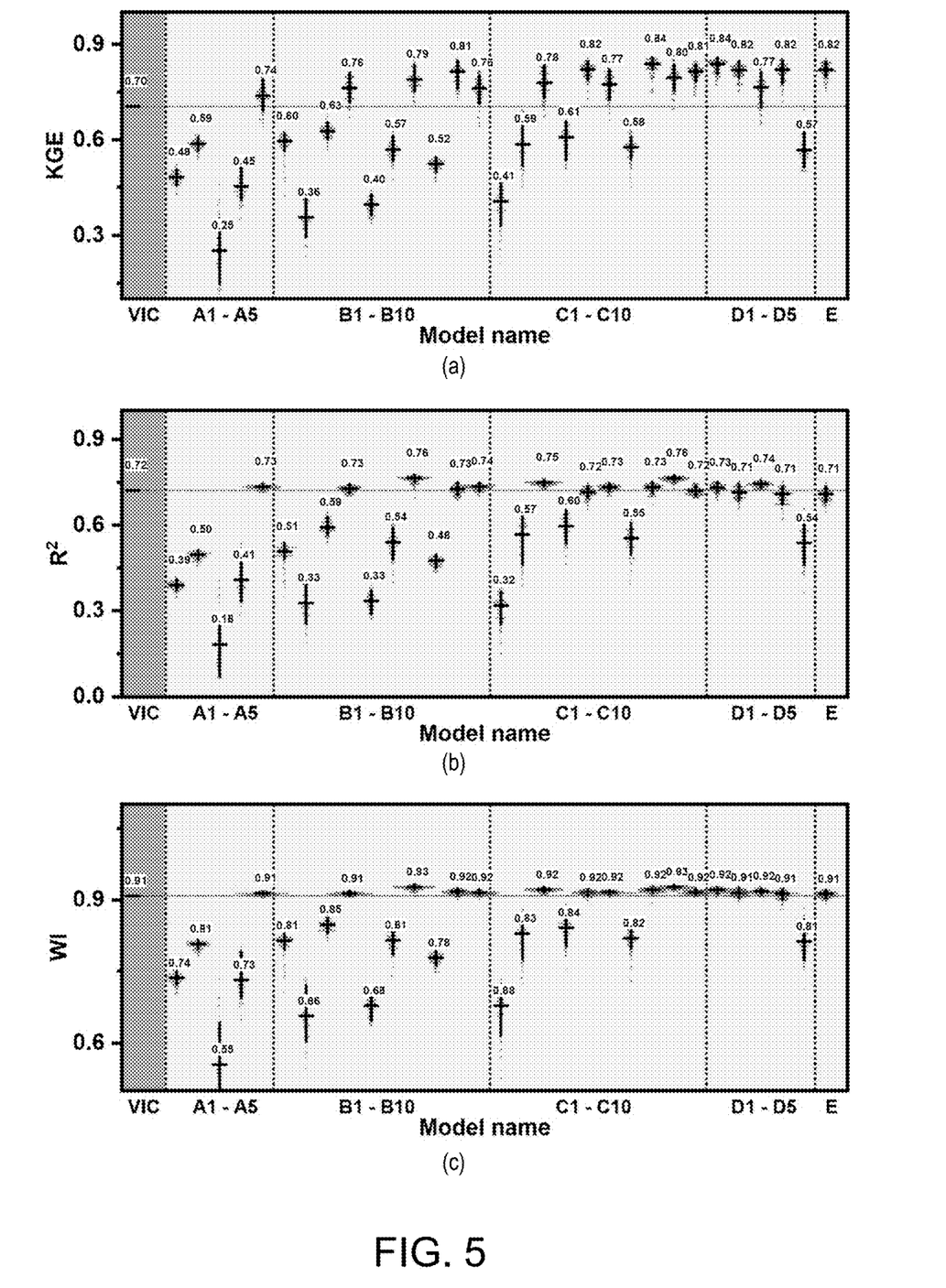
FIG. 5 is a comparison diagram of forecast results of a VIC model (a) and a deep learning model (b) in the prior art against a forecast result of a composite model (c) of the present disclosure.

(1) FIG. 5 is a comparison diagram of the forecast results of the VIC model, the deep learning model and the composite model involved in an embodiment of the present disclosure. In FIG. 5, the first column represents the results of the process-driven model; the grey discrete points represent the deep learning model, and the black discrete points represent the composite model. Furthermore, since the initialization weight of the deep learning model is random and may have great impact on the training effect of the model, in order to eliminate the bias of the model training effect resulting from the randomness, 31 models are trained for 100 times respectively in the embodiment and medium values are selected to compare the different models. The model names A1-E1 in FIG. 5 correspond to 31 predictor combinations in Table 3. In this embodiment, after all cases are combined, it is found that the forecast effect of the composite model is always superior to those of the models in the prior art. It can be seen that three indices KGE, $R^2$ and WI corresponding to the composite model of the present disclosure in FIG. 5 are all above or around the transverse dotted line in respective FIGs, and more approximate to the optimal index 1, whereas the models in the prior arts have the indices much lower than those of the composite model of the present disclosure. As shown in FIG. 5, the indices of KGE, $R^2$ and W/of the process-driven model are 0.70, 0.72 and 0.91; the indices KGE, $R^2$ and WI of the model B3 performing best among the deep learning models are 0.63, 0.59 and 0.85; and the indices KGE, $R^2$ and WI of the composite model of the present disclosure (with C9 as an example) are 0.80, 0.76 and 0.93.

Figure 6:
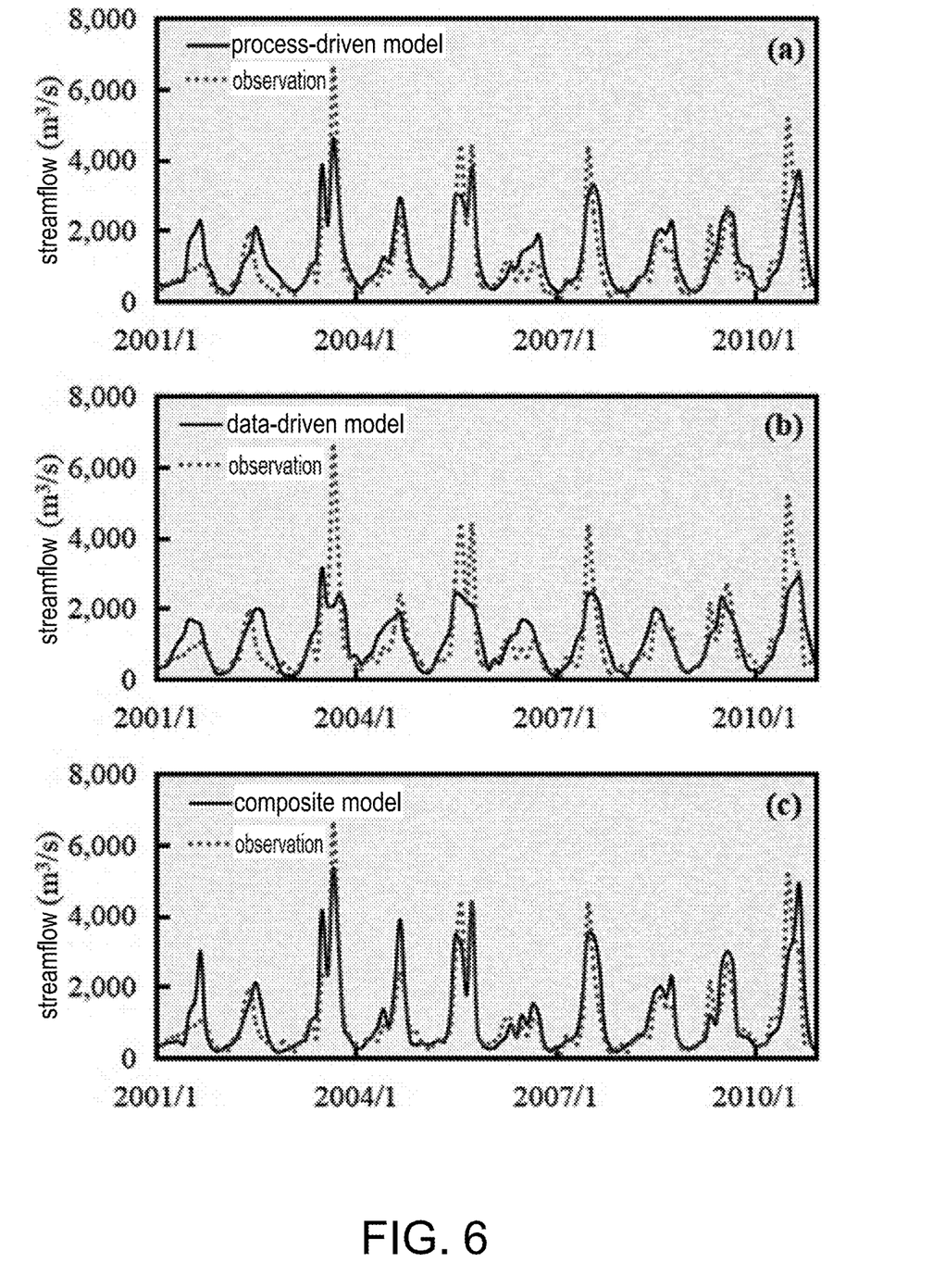
FIG. 6 is a comparison diagram of streamflow forecast processes of a VIC model (a) and a deep learning model (b) in the prior art against a streamflow forecast process of a composite model (c) of the present disclosure.

(2) FIG. 6 is a comparison diagram of streamflow forecast processes of the VIC model and the deep learning model in the prior art against a streamflow forecast process of the composite model of the present disclosure. In the deep learning models, the model B3 performing best in the indexes KGE, $R^2$ and WI is selected. It can be seen from the FIG. that the deep learning model always underestimates the streamflows of the flood seasons, whereas the composite model can forecast the annual streamflow process well.

The above data fully proves that the technical solution of the present disclosure is much better in streamflow forecast efficiency and accuracy than the most advanced technologies in the prior arts. The present disclosure can achieve the optimal forecast effect with minimum computational resources, bringing prominent advantages of high efficiency and high accuracy.

In conclusion, the technical solution of the present disclosure is perfect, clear in thinking and scientifically reasonable, and far better than the conventional technical solutions in trustability, reliability and flexibility and thus can achieve the optimal forecast performance.

Furthermore, an embodiment of the present disclosure further provides a long-term streamflow forecast system for automatically performing the above method. The system includes a collecting part, a calibrating and validating part, a correcting and disaggregating part, a calibration period runoff yield calculation part, an improving part, a full time period runoff yield calculation part, a candidate predictor obtaining part, a composite model forming part, and a streamflow forecasting part, an input displaying part and a controlling part.

The collecting part is configured to perform the operations described in the above step 1: collecting streamflow data, meteorological data, climate system indices, climate model forecasts, watershed elevation data, soil data and vegetation data.

The calibrating and validating part is configured to perform the operations described in the above step 2: constructing a daily-scale Variable Infiltration Capacity (VIC) distributed hydrological model of a target watershed and performing calibration and validation for model parameters.

The correcting and disaggregating part is configured to perform the operations described in the above step 3: after the climate model forecasts is spatially interpolated to a grid scale matching the VIC distributed hydrological model, firstly using a linear scaling method to perform bias correction on the climate model forecasts, and then using a k-nearest neighbor algorithm-based model to disaggregate monthly-scale meteorological data forecast by a climate model into daily data.

The calibration period runoff yield calculation part is configured to perform the operations described in the above step 4: by using the spatially-interpolated and disaggregated climate model forecasts, driving the VIC model to perform gridded runoff yield calculation within a calibration period.

The improving part is configured to perform the operations described in the above step with observed monthly streamflow values of an outlet hydrological station within the calibration period as dependent variables and with monthly data obtained by aggregating runoff yield outputs of all grids within the watershed in different lead times as independent variables, selecting a third layer of soil moistures with the runoff yield outputs as daily scale, and using a LASSO regression model to perform feature variable screening, and then taking the grids corresponding to the screened-out runoff yield outputs as typical grids to construct an improved VIC model.

The full time period runoff yield calculation part is configured to perform the operations described in the above step 6: driving the improved VIC model with the disaggregated climate model forecasts to perform gridded runoff yield calculation of a full time period.

The candidate predictor obtaining part is configured to perform the operations described in the above step 7: re-aggregating daily-scale gridded runoff yield calculation results of the improved VIC model into monthly-scale data and combining the monthly-scale data with historical streamflows, climate model forecasts, meteorological data and climate system indices to form a candidate predictor set of the data-driven model.

The composite model forming part is configured to perform the operations described in the above step 8: performing normalization on the candidate predictor set and the monthly streamflow data respectively and then screening predictors by using a machine learning model; then, training a deep learning model using the screened-out predictors to further obtain a composite model based on process-data synergic drive.

The streamflow forecasting part is configured to perform long-term streamflow forecast by using the composite model based on process-data synergic drive.

The input displaying part is configured to communicate with the collecting part, the calibrating and validating part, the correcting and disaggregating part, the calibration period runoff yield calculation part, the improving part, the full time period runoff yield calculation part, the candidate predictor obtaining part, the composite model forming part, and the streamflow forecasting part and the controlling part respectively to allow a user to input an operation instruction and perform corresponding displaying. For example, the input displaying part can display each item to be collected and allow a user to input or import collected data. Further, the input displaying part can also display input, output, intermediate data, and processing procedure of each part and can display the data in the form of spreadsheet, or two-dimensional, three-dimensional or dynamically changing view.

The controlling part is configured to communicate with the collecting part, the calibrating and validating part, the correcting and disaggregating part, the calibration period runoff yield calculation part, the improving part, the full time period runoff yield calculation part, the candidate predictor obtaining part, the composite model forming part, the streamflow forecasting part, and the input displaying part respectively to control operations thereof.

The long-term streamflow forecast method based on process-data synergic drive of the present application relies on an electronic device in the implementation process, including Processor. The processor can be a central processing unit (CPU, such as Intel® Xeon® Silver 4114 CPU @ 2.20 GHz) or other forms of processing unit with data processing capability and instruction execution capability (such as graphics processing unit, GPU).

Memory. The memory includes one or more computer programming products, which include various forms of computer-readable storage media, such as volatile memory and/or non-volatile memory devices. The volatile memory device includes, for example, random access memory (RAM) and/or cache memory (cache). The non-volatile memory device includes, for example, read-only memory (ROM), hard disk, flash memory, etc. The memory can store the collected streamflow data, meteorological data, climate system indices, climate model forecasts, watershed elevation data, soil data and vegetation data, as well as the computer programming instructions related to the long-term streamflow forecast method based on process-data synergic drive of the present application. When the computer programming instruction is executed by the processor, the processor performs the long-term streamflow forecast method and system based on process-data synergic drive described in any step from 1 to 8 to achieve the long-term streamflow forecasting function described in this application. The computer-readable storage medium can also store various contents, such as meteorological driving data at daily scale, fluxes files at daily scale, etc. It should be noted that during the implementation of this method, the external storage capacity should be at least 8 TB, and the internal storage capacity should be at least 64 GB.

Python programming environment. The Python programming environment needs to include, but is not limited to, the following modules. The module version can be adjusted based on the relevant models: h5py=2.10.0, hdf5=1.10.4, keras-applications=1.0.8, keras-processing=1.1.2, numpy=1.19.2, numpy-base=1.19.2, openssl=1.1.1m, pandas=1.1.5, python=3.6.13, scikit-lear=0.24.2, scipy=15.2, tensorboard=1.15.0, tensorflow=1.15.0, tensorflow base=1.15.0, tensorflow sorflow-estimator=1.15.1, tensorflow-gpu=1.15.0, xlrd=1.2.0, xlsxwriter=3.0.3, zlib=1.2.11.

The above embodiments are only illustratively described for the technical solution of the present disclosure. The long-term streamflow forecast method and system based on process-data synergic drive in the present disclosure is not limited to the contents of the above embodiments but only limited by the appended claims. Any changes, supplementations or equivalent replacements made by those skilled in the art based on these embodiments shall fall within the scope of protection claimed by the claims of the present disclosure.

What is claimed is:

1. A long-term streamflow forecast method based on process-data synergic drive, comprising following steps:

step 1, collecting streamflow data, meteorological data, climate system indices, climate model forecasts, watershed elevation data, soil data and vegetation data;

step 2, constructing a daily-scale Variable Infiltration Capacity (VIC) distributed hydrological model of a target watershed and performing calibration and validation for model parameters;

step 3, after spatially interpolating the climate model forecasts to a grid scale matching the VIC distributed hydrological model, firstly using a linear scaling method to perform bias correction on the climate model forecasts, and then using a k-nearest neighbor algorithm-based model to disaggregate monthly-scale meteorological data forecasted by a climate model into daily data;

step 4, by using the spatially-interpolated and disaggregated climate model forecasts, driving the VIC distributed hydrological model to perform a gridded runoff yield calculation within a calibration period;

step 5, with observed monthly streamflow values of an outlet hydrological station within the calibration period as dependent variables and with monthly data obtained by aggregating runoff yield outputs of all grids within a watershed in different lead times as independent variables, selecting a third layer of soil moistures with the runoff yield outputs as daily scale, and using a LASSO regression model to perform feature variable screening, and then taking grids corresponding to the screened-out runoff yield outputs as typical grids to construct an improved VIC model; the step 5 comprising the following sub-steps:

sub-step 5.1, extracting observed daily streamflow values of the outlet hydrological station within the calibration period and the runoff yield outputs of all grids within the watershed in different lead times; aggregating both the streamflows and the runoff yield outputs into monthly data and then performing normalization to eliminate a dimensional influence between variables;

sub-step 5.2, with the monthly streamflow values as dependent variables and with the runoff yield outputs of the grids as independent variables, using the LASSO regression model to perform feature variable screening, wherein a target function set in the form of least square is $$\min\left\{\sum_{i=1}^{m}\left(y_i - \beta_0 - \sum_{j=1}^{n} x_{ij}\beta_j\right) + \lambda \sum_{j=1}^{n} |\beta_j|\right\};$$

in the formula, x and y correspond to the independent variables and the dependent variables respectively, m corresponds to a dependent variable series length, n corresponds to a number of grids of the target watershed, $\beta_0$ is a constant item, $\beta$ is a coefficient of each variable, $\lambda$ is a penalty parameter; taking the grids corresponding to the screened-out runoff yield outputs as typical grids;

step 6, driving the improved VIC model with the disaggregated climate model forecasts to perform the gridded runoff yield calculation of a full time period;

step 7, re-aggregating daily-scale gridded runoff yield calculation results of the improved VIC model into monthly-scale data and combining the monthly-scale data with historical streamflows, the climate model forecasts, the meteorological data and the climate system indices to form a candidate predictor set of a data-driven model, wherein different lag times are to be considered for the influence of the historical streamflows, the meteorological data and the climate system indices on the forecast monthly streamflows;

step 8, performing normalization on the candidate predictor set and the monthly streamflow data respectively and screening predictors by using a machine learning model; then, training a deep learning model using the screened-out predictors to further obtain a composite model based on process-data synergic drive, and using the composite model to perform long-term streamflow forecast.

2. The long-term streamflow forecast method of claim 1, wherein, the step 2 comprises the following sub-steps:

sub-step 2.1, performing grid division on the target watershed and preparing a longitude and latitude coordinate file of a grid center;

sub-step 2.2, preparing a ratio file of a watershed-covered area in each grid, a region flow direction file, a soil data file and a land utilization input file;

sub-step 2.3, interpolating daily-scale meteorological observation data of the watershed to a grid scale to obtain a meteorological forcing input file;

sub-step 2.4, after performing trial operation on the VIC distributed hydrological model based on default initial parameters, with a Nash-Sutcliffe efficiency coefficient and a relative error of a total streamflow as a target function, performing calibration on runoff generation and routing parameters of the watershed.

3. The long-term streamflow forecast method of claim 1, wherein, the step 3 comprises the following sub-steps:

sub-step 3.1, interpolating observation data and the climate model forecasts to a grid scale matching the VIC distributed hydrological model;

sub-step 3.2, taking a ratio of a mean value of the meteorological data forecasted by the climate model for the months of multiple years and a mean value of the observed meteorological data as a correction factor to perform bias correction on precipitation and maximum and minimum air temperatures forecast by the climate model respectively; if precipitation of an r-th month of a year with a lead time of s months is to be corrected, performing correction in formula: $M_{cor}(s)=M(s)\times(\overline{M}_{obs,r}/\overline{M}_{pred,r})$; if maximum and minimum air temperatures of an r-th month of a year with a lead time of s months are to be corrected, performing correction in formula $M_{cor}(s)=M(s)+(\overline{M}_{obs,r}/\overline{M}_{pred,r})$; wherein, $M_{cor}(s)$ is corrected forecast data, $M(s)$ represents raw forecast data to be corrected, $\overline{M}_{obs,r}$ represents a mean value of the observation data, and $\overline{M}_{pred,r}$ represents a mean value of the forecast data;

sub-step 3.3, by using Gram-Schmidt orthogonalization method, transforming the observed meteorological data X of a historical period into an orthogonal matrix Y in formula Y=RX, wherein R is a rotation matrix;

sub-step 3.4, calculating an Euclidean distance between the forecast monthly meteorological data to be disaggregated and the observed monthly meteorological data for the historical period, and then selecting K pieces of monthly data with minimum distance and assigning weights, formula is:

$$W(k) = 1/k \sum_{u=1}^{K} \frac{1}{u},$$

wherein k=1, 2, ..., K;

sub-step 3.5, using these weights as a probabilistic metric to construct a one-dimensional matrix y* of the disaggregated forecast data;

sub-step 3.6, transforming the matrix y* back to an initial space to obtain the daily-scale climate model forecasts x* in the formula x*=$R^T$y*, wherein $R^T$ is a transpose matrix of R.

4. The long-term streamflow forecast method of claim 1, wherein, the step 8 comprises the following sub-steps:

sub-step 8.1, stacking two layers of a restricted Boltzmann machine and one layer of a back propagation neural network into a deep belief network model;

sub-step 8.2, training the constructed deep belief network model, including two steps of an unsupervised pre-training and a supervised fine-tuning.

5. The long-term streamflow forecast method of claim 4, wherein, in the sub-step 8.1, the restricted Boltzmann machine is formed by a visible layer v and a hidden layer h, wherein there is no intra-layer connection but inter-layer full connection in the network of the restricted Boltzmann machine; for one set of given states (v,h), a jointly-configured energy function of a visible unit and a hidden unit is based on formula:

$$E(v, h | \theta) = -\sum_{p=1}^{V}\sum_{q=1}^{H} v_p w_{pq} h_q - \sum_{p=1}^{V} b_p v_p - \sum_{q=1}^{H} c_q h_q;$$

in the formula, θ represents a parameter {w,b,c} of the restricted Boltzmann machine, $w_{pq}$ is a connection weight between a p-th visible unit and a q-th hidden unit, b($[b_1, \ldots, b_V]$) and c($[c_1, \ldots, c_H]$) are respective bias vectors of the p-th visible unit and the q-th hidden unit, and V and H represent a number of neuron nodes of the visible layer and the hidden layer respectively.

6. The long-term streamflow forecast method of claim 4, wherein, in the sub-step 8.2, the pre-training process is a down-top training performed based on a greedy layer-wise contrastive divergence algorithm of the restricted Boltzmann machine; after a first restricted Boltzmann machine is trained, an input of a next restricted Boltzmann machine is an output of the current restricted Boltzmann machine, and thus a layer-wise transfer is carried out by repeating the training to further optimize parameters of the model, so as to minimize a error function and achieve local optimum; a reverse fine-tuning process is that, at a last layer of the restricted Boltzmann machine, training errors are propagated to the layer of the restricted Boltzmann machine from top down by using a supervised learning method of the back propagation neural network, and then the entire restricted Boltzmann machine is fine-tuned to achieve global optimum.

7. A long-term streamflow forecast system based on process-data synergic drive, comprising:

a collecting part, configured to collect streamflow data, meteorological data, climate system indices, climate model forecasts, watershed elevation data, soil data and vegetation data;

a calibrating and validating part, configured to construct a daily-scale Variable Infiltration Capacity (VIC) distributed hydrological model of a target watershed, and perform calibration and validation for model parameters;

a correcting and disaggregating part, configured to, after the climate model forecasts is spatially interpolated to a grid scale matching the VIC distributed hydrological model, firstly use a linear scaling method to perform bias correction on the climate model forecasts, and then use a k-nearest neighbor algorithm-based model to disaggregate monthly-scale meteorological data forecasted by a climate model into daily data;

a calibration period runoff yield calculation part, configured to, by using the spatially-interpolated and disaggregated climate model forecasts, drive the VIC distributed hydrological model to perform a gridded runoff yield calculation within a calibration period;

an improving part, configured to, with observed monthly streamflow values of an outlet hydrological station within the calibration period as dependent variables and with monthly data obtained by aggregating runoff yield outputs of all grids within a watershed in different lead times as independent variables, select a third layer of soil moistures with the runoff yield outputs as daily scale, and use a LASSO regression model to perform feature variable screening, and then take grids corresponding to the screened-out runoff yield outputs as typical grids to construct an improved VIC model;

a full time period runoff yield calculation part, configured to drive the improved VIC model with the disaggregated climate model forecasts to perform the gridded runoff yield calculation of a full time period;

a candidate predictor obtaining part, configured to re-aggregate daily-scale gridded runoff yield calculation results of the improved VIC model into monthly-scale data and combine the monthly-scale data with historical streamflows, the climate model forecasts, the meteorological data and the climate system indices to form a candidate predictor set of a data-driven model, wherein different lag times are to be considered for the influence of the historical streamflows, the meteorological data and the climate system indices on the forecast monthly streamflows;

a composite model forming part, configured to perform normalization on the candidate predictor set and the monthly streamflow data respectively and then screen predictors by using a machine learning model; then, train a deep learning model using the screened-out predictors to further obtain a composite model based on process-data synergic drive;

a streamflow forecasting part, configured to use the composite model based on process-data synergic drive to perform long-term streamflow forecast;

a controlling part, configured to communicate with the collecting part, the calibrating and validating part, the correcting and disaggregating part, the calibration period runoff yield calculation part, the improving part, the full time period runoff yield calculation part, the candidate predictor obtaining part, the composite model forming part, and the streamflow forecasting part respectively to control operations thereof;

wherein, in the improving part, the observed daily streamflow values of the outlet hydrological station within the calibration period and the runoff yield outputs of all grids within the watershed in different lead times are firstly extracted; then, normalization is performed on monthly data obtained by aggregating both the streamflows and the runoff yield outputs to eliminate a dimensional influence between variables; with the monthly streamflow values as dependent variables and with the runoff yield outputs of the grids as independent variables, the LASSO regression model is used to perform feature variable screening, wherein a target function set in the form of least square is:

$$\min\left\{\sum_{i=1}^{m}\left(y_i - \beta_0 - \sum_{j=1}^{n} x_{ij}\beta_j\right) + \lambda\sum_{j=1}^{n}|\beta_j|\right\}$$

in the formula, x and y correspond to the independent variables and the dependent variables respectively, m corresponds to a dependent variable series length, n corresponds to a number of grids of the target watershed, $\beta_0$ is a constant item, $\beta$ is a coefficient of each variable, $\lambda$ is a penalty parameter; the grids corresponding to the screened-out runoff yield outputs are taken as typical grids.

8. The long-term streamflow forecast system of claim 7, further comprising:

an input displaying part, configured to communicate with the collecting part, the calibrating and validating part, the correcting and disaggregating part, the calibration period runoff yield calculation part, the improving part, the full time period runoff yield calculation part, the candidate predictor obtaining part, the composite model forming part, and the streamflow forecasting part and the controlling part respectively, to allow a user to input an operation instruction and perform corresponding displaying.

* * * * *